United States Patent [19]

Yeh

[11] Patent Number: 5,275,180
[45] Date of Patent: Jan. 4, 1994

[54] VEHICLE CIGARETTE LIGHTER

[76] Inventor: Jui-Hao Yeh, Suite 1, 11F, 95-8 Chang Ping Road, Sec. 1, Taichung, Taiwan

[21] Appl. No.: 982,397

[22] Filed: Nov. 27, 1992

[51] Int. Cl.$^5$ .......................... A24F 13/00; F23Q 7/00
[52] U.S. Cl. ........................... 131/329; 219/260; 219/267; 219/270
[58] Field of Search ................ 131/329; 219/202, 260, 219/267, 270

[56] References Cited

U.S. PATENT DOCUMENTS

| 1,844,206 | 2/1932 | Copeland | 219/267 X |
| 3,454,742 | 7/1969 | O'Brien | 219/267 |
| 3,526,751 | 9/1970 | Climent | 219/267 |
| 3,705,414 | 12/1972 | Senkewich | 219/267 X |
| 3,769,492 | 10/1973 | Senkewich | 219/267 X |
| 3,789,187 | 1/1974 | Brezina | 219/267 X |
| 4,387,292 | 6/1983 | Vitaloni | 219/270 X |
| 4,621,649 | 11/1986 | Osterrath | 131/329 X |
| 4,947,873 | 8/1990 | Wang | 131/329 |

FOREIGN PATENT DOCUMENTS

| 2442002 | 3/1976 | Fed. Rep. of Germany | 219/267 |
| 2928431 | 1/1981 | Fed. Rep. of Germany | 131/329 |
| 2150272 | 6/1985 | United Kingdom | 131/329 |

Primary Examiner—V. Millin
Assistant Examiner—Raleigh W. Chiu

[57] ABSTRACT

A vehicle cigarette lighter comprises a casing ball-jointed to a plug member which is removably insertable into and thus electrically connectable with a lighter socket formed on the dashboard of a vehicle. A lighting unit comprising a heating device is disposed within the casing to receive and light a cigarette therein. Warning circuits are provided to send off aural and visual signals when the cigarette is inserted into the cigarette lighter. A control circuit is provided to shut off power supplied thereto if the cigarette has been deposited in the cigarette lighter for a given period or the temperature of the heating device has reached a pre-determined level. The plug member has mounted on one end thereof a ring member which has several outward deflected resilient tabs formed by punching or pressing to provide a more secure contact with the lighter socket of vehicle dashboard.

10 Claims, 3 Drawing Sheets

VEHICLE CIGARETTE LIGHTER

FIELD OF THE INVENTION

The present invention relates generally to a vehicle cigarette lighter and in particular to an automatic cigarette lighter which upon a cigarette is inserted therein gives off audio and video signals and automatically cuts off power supplied thereto after a given period or a pre-determined temperature is reached.

BACKGROUND OF THE INVENTION

Conventional vehicle cigarette lighters are socket-plug type, namely a plug member with heating element is inserted into a socket formed on the dashboard of a vehicle to have an electrical current from the electricity system of the vehicle conducted therethrough to heat the heating element to a substantially high temperature. The plug member is then withdrawn from the socket to light a cigarette which is being held in the mouth of a person with the high temperature heating element. If the person who wants to light the cigarette is a driver controlling the vehicle, then it is probably very dangerous for the driver to have his eyesight directed to the cigarette lighter for lighting the cigarette.

It is therefore desirable to have an automatic cigarette lighter to be attached on the dashboard of vehicles to automatically light a cigarette deposited therein and automatically shut down the power supply when the cigarette is lit.

SUMMARY OF THE INVENTION

The principal object of the present invention is to provide an automatic cigarette lighter which is removably inserted into the cigarette lighter socket of the dashboard of a vehicle to receive therein a cigarette to be lighted and which sends off audio and visual warning signals once the cigarette is inserted therein and automatically cuts off the electricity supplied thereto when the cigarette is lit.

Another object of the present invention is to provide a vehicle cigarette lighter comprising a plug portion, which is to be inserted into the lighter socket of the vehicle dashboard, and a lighting piece, which is to receive the cigarette to be lighted, ball-jointed together so that when the plug portion is insertedly mounted to the cigarette lighter socket, the lighting piece can be oriented toward any desirable direction to receive therein the cigarette to be lit.

It is also an object of the present invention to provide a vehicle cigarette lighter comprising a plug portion to be insertedly mounted to the cigarette lighter socket of the dashboard of a vehicle, which plug portion comprises a metal ring surrounding around one end thereof with a plurality of outward-bent resilient tabs formed thereon, preferably formed by punching or pressing to provide a secure electrical connection with the cigarette lighter socket.

To achieve the above-mentioned objects, there is provided a vehicle cigarette lighter comprising a casing ball-jointed to a plug member which is removably insertable into and thus electrically connectable with a lighter socket formed on the dashboard of a vehicle. A lighting unit comprising a heating device is disposed within the casing to receive and light a cigarette therein. Warning circuits are provided to send off audio and video when the cigarette is inserted into the cigarette lighter. A control circuit is provided to shut off power supplied thereto if the cigarette has been deposited in the cigarette lighter for a given period or the temperature of the heating device has reached a pre-determined level. The plug member has mounted on one end thereof a ring member which has several outward deflected resilient tabs formed by punching or pressing to provide a more secure contact with the lighter socket of vehicle dashboard.

Other objects and advantages of the invention will be apparent from the following description of a preferred embodiment taken in connection with the accompanying drawings wherein:

DETAILED DESCRIPTION OF THE PREFERRED EMBODIMENT

Figure 1:
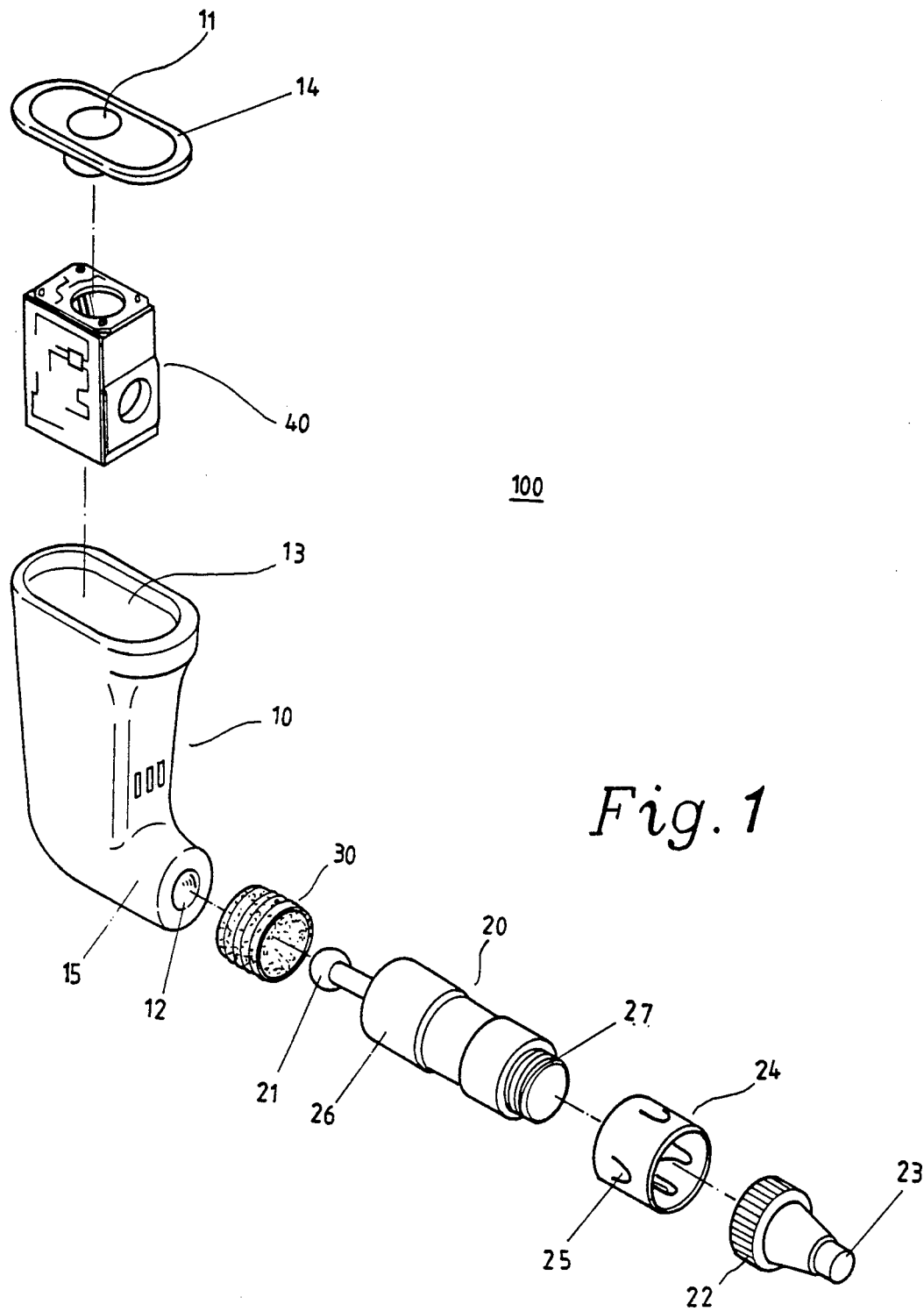
FIG. 1 is a perspective fragmentary view of an automatic cigarette lighter made in accordance with the present invention.
Figure 2:
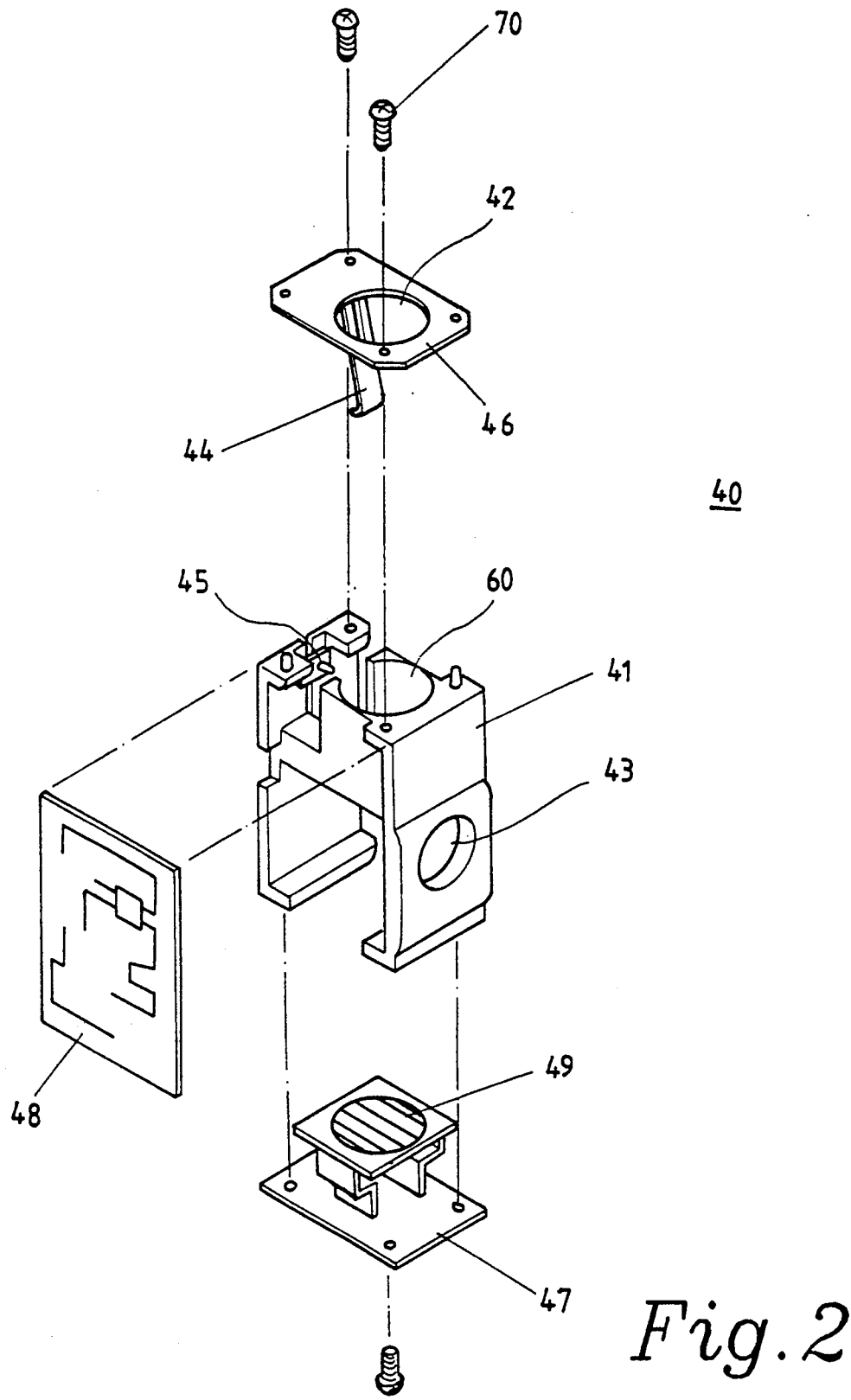
FIG. 2 is a fragmentary view in a larger scale showing the lighting unit used in the automatic cigarette lighter shown in FIG. 1.

With reference to the drawings and in particular to FIGS. 1 and 2, wherein an automatic cigarette lighter in accordance with the present invention, generally designated with the reference numeral 100 is shown, the cigarette lighter 100 comprises a hollow casing 10 having a first end 13 which is open to receive therein a lighting unit 40. A lid 14 is provided to seal the open end 13 of the casing 10 when the lighting unit 40 has been deposited into the hollow casing 10 through the open end 13 thereof.

Figure 4:
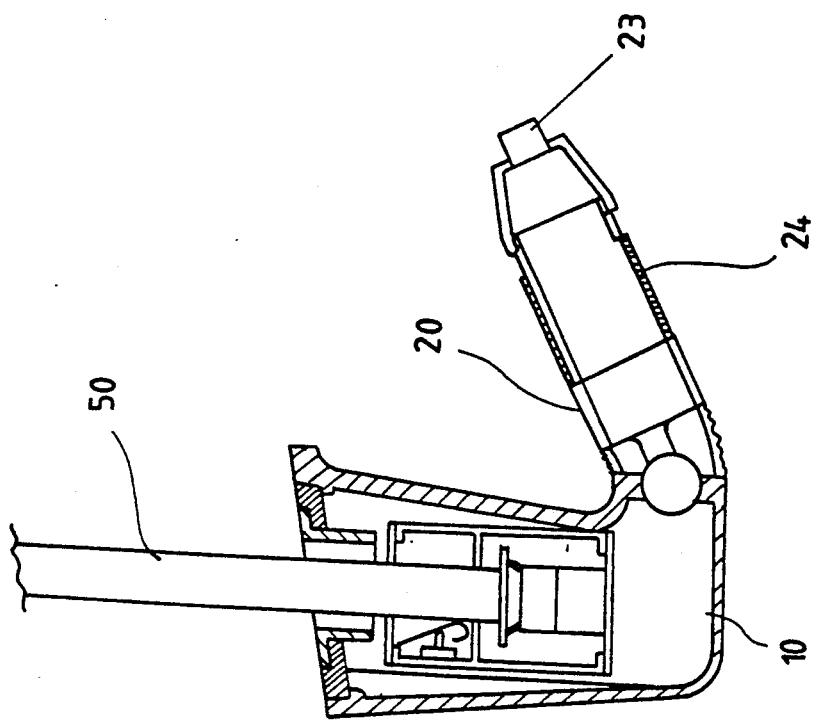
FIG. 4 is also a cross-sectional view, taken at the same section as that of FIG. 3, showing a cigarette to be lighted deposited in the cigarette lighter of the present invention.
Figure 3:
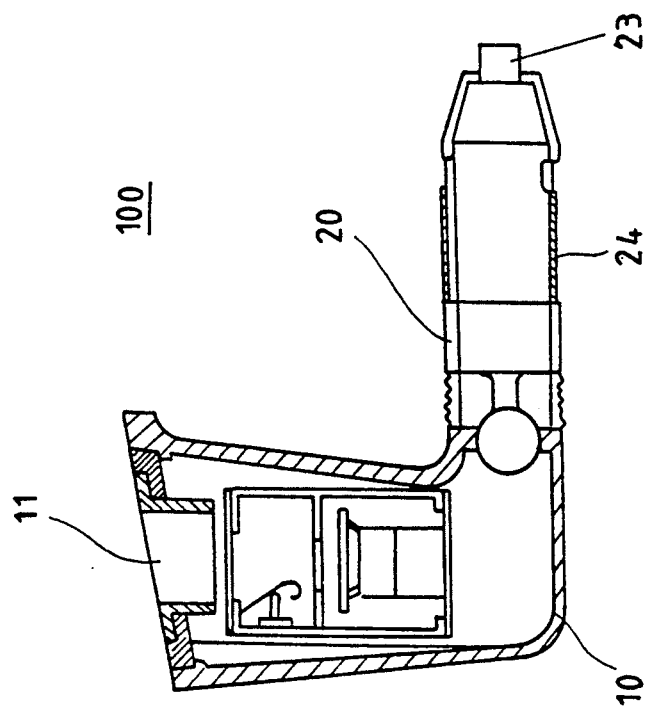
FIG. 3 is a cross-sectional view showing the automatic cigarette lighter shown in FIG. 1.

The lid 14 is provide with an opening 11 for receiving therein a cigarette 50 (see FIG. 4) to be lighted by the lighting unit 40. Corresponding to the opening 11, a cigarette receiving hole 42 is provided on the lighting unit 40 to allow the cigarette 50 to be inserted through the opening 11 to penetrate into the lighting unit 40 and thus contacting and lighted by heating means 49 which will be further described hereinafter.

The casing 10 comprises a second end 15 ball-jointed to a first end 26 of a plug member 20 which is to be disengagably insertable into a lighter socket of a vehicle dashboard (not shown). Although the lighter socket is not explicitly illustrated in the drawings, it is readily understood by a person having ordinary skill how to perform the insertion of the plug member 20 of the present cigarette into the lighter socket for this is similar to the conventional cigarette lighter mounted within a vehicle. The ball joint between the casing 10 and the plug member 20 provides the casing 10 and thus the cigarette opening 11 the ability of orienting along any desired direction with the plug member 20 inserted in the lighter socket, as the situation shown in FIG. 4.

As those skilled in the art of mechanical engineering will appreciate, the ball joint between the casing 10 and the plug member 20 comprises a ball-shaped or spherical element 21 secured on, for example, the plug member 20 and a corresponding socket element 12 formed on, for example, the casing 10 to three-dimensionally rotatably receive therein the ball-shaped element 21. It is also understood that the ball-shaped element may be formed on the casing 10 while the socket element on the plug member 20 without affecting the function thereof.

Still referring to FIG. 1, the plug member 20 comprises a second end 27 opposite to the first end 26 thereof for inserting into the lighter socket of the vehicle dashboard. The second end 27 of the plug member 20 has a cap 22 mounted thereon. The cap 22 is provided with a conductive terminal 23, preferably made of a metal of high electrical conductivity, to serve as a first electrical pole, such as the anode, of the automatic cigarette lighter 100 of the present invention. Substantially on the connection between the cap 22 and the second end 27 of the plug member 20, a conductive ring 24, preferably made of a metal of high electrical conductivity, is secured around the plug member 20 to serve as a second electrical pole, such as the cathode, of the automatic cigarette lighter 100 of the present invention.

Preferably, the conductive ring 24 is provided with a plurality of outward bent tabs 25 which are preferably formed by pressing or punching the conductive ring 24 and dispose around the ring 24 so as to provide a better and more secure physical contact between the conductive ring 24 and an inner side wall of the lighter socket of the vehicle dashboard due to the elastic deformation of the tabs 25 when the plug member 20 is inserted into the lighter socket. This helps to further securely hold the plug member 20 in the lighter socket of the vehicle dashboard and establishing a better electrical connection between the lighter socket and the plug member 20.

Referring now to FIG. 2, the lighting unit 40 comprises a base 41, preferably made of a temperature-resistant insulating material, such as plastics or Bakelite, having at least a top, a bottom and a lateral side on which a first circuit board 46, a second circuit board 47 and a third circuit board 48 are respectively mounted by any known fastening means, such as screws 70 shown in the drawings. The first circuit board 46 which is secured on the top of the base 41 is provided with a cigarette receiving hole 42 thereon. A corresponding through hole 60 is formed on the base 41 to serve as an extension of the cigarette receiving hole 42 of the first circuit board 46 to allow the cigarette 50 to penetrate therethrough.

A resilient leaf member 44 is secured with one end thereof on the first circuit board 46. A switch 45 is disposed in the base 41 in such a location that when the cigarette 50 is inserted through the cigarette receiving hole 42 and penetrating into the through hole 60 of the base 41, the resilient leaf member 44 is elastically deflected to contact and turn on the switch 45 which in turn, through circuits formed on the circuit boards 46, 47 and/or 48, energizes the heating plate 49 supported on the second circuit board 47 which is secured on the bottom of the base 41 to heat and thus light the cigarette 50 penetrating through the through hole 60 of the base 41 and in contact therewith. In this way, a user needs only to deposit the cigarette 50 into the present automatic cigarette lighter 100, the cigarette 50 can then be automatically lighted by the automatic cigarette lighter 10.

The heating means 49 may consist of high electrical resistance elements which when a current supplied from the electricity system of the vehicle flows therethrough, convert the electrical energy into heat to light the cigarette 50. Since such electrical heating elements or the technique therefor is familiar to those having an ordinary skill, no further details regarding the construction and operation of the heating means 49 will be given hereinafter.

An ash hole 43 is provided on the base 41 in such a location to allow a user to blow, with an air current, the cigarette ash generated during lighting the cigarette out of the lighting unit 40 and thus avoid the accumulation of cigarette ash therein.

The first and the second circuits 46 and 47 are designed in such a way that when the cigarette 50 is inserted into the automatic cigarette lighter 100, the first circuit 46 and the second circuit 47 respectively send off an audio signal, such as a warning sound or a melody, and a video signal, such as a flashing light to indicate the disposition of the cigarette 50 in the present automatic cigarette lighter 100.

The circuit of the third circuit 48 which is secured on a lateral side of the base 41 is provided with cutting-off means which automatically cuts off the electrical power supplied to the heating means 49 when the temperature of the heating means 49 reaches a pre-determined level or the disposition of the cigarette 50 in the automatic cigarette lighter 10 has exceeded a pre-determined time interval. In this way, the dangers caused by overheating the cigarette 50 can be effectively avoided and the waste of power is also cut down.

It is apparent that although the invention has been described in connection with a preferred embodiment, those skilled in the art may make changes to certain features of the preferred embodiment without departing from the spirit and scope of the invention as defined in the appended claims.

What is claimed is:

1. A cigarette lighter for disengagably inserting into a lighter socket formed on a vehicle dashboard and in electrical connection with an electricity system of the vehicle, said cigarette lighter comprising:

a hollow casing having a first end which is open and a second end;

a lighting unit disposed in said hollow casing through the open end thereof, a lid being attached to said open end to seal said open end with an opening formed thereon to allow a cigarette to be lit to penetrate therethrough, said lighting unit comprising a base which has at least a top, a bottom and a lateral side with a first circuit board, a second circuit board and a third circuit board respectively mounted thereon, said first circuit board having a cigarette receiving hole formed thereon and said base having a through hole corresponding to said cigarette receiving hole to form an extension thereof so as to allow the cigarette which penetrates through the opening of said lid to further penetrate therethrough, a resilient leaf member being secured with one end thereof on said first circuit board so that when the cigarette is inserted into the through hole of said base, said leaf member is elastically deflected to contact and thus turn on a switch to allow electricity from the vehicle electricity to supply thereto and thus energizing, via circuits formed on said circuit boards, heat means supported on said base in such a location that when the cigarette is inserted into and extending through said through hole of said base, the cigarette is contactable with said heating means to be lit thereby; and a plug member having a first end ball-jointed to the second end of said casing, said plug member having a cap mounted on a second end thereof to be inserted into the lighter socket, said cap comprising a conductive terminal to serve as a first electrical pole of said cigarette lighter, said plug member further comprising a conductive ring disposed around a connection between the cap and the second end of said plug member to serve as a second electrical pole of said cigarette lighter.

2. A cigarette lighter as claimed in claim 1 wherein said first circuit board comprises a sound generation circuit formed thereon which sounds off a melody when the cigarette is inserted into said cigarette lighter.

3. A cigarette lighter as claimed in claim 1 wherein said second circuit board comprises a flash generation circuit formed thereon which gives off light when the cigarette is inserted into said cigarette lighter.

4. A cigarette lighter as claimed in claim 1 wherein said third circuit board comprises a power cutting off circuit formed thereon which cuts off the electricity supplied to said heating means when the cigarette which is inserted in said cigarette lighter is lit.

5. A cigarette lighter as claimed in claim 1 wherein said third circuit board comprises a power cutting off circuit formed thereon which cuts off the electricity supplied to said heating means when the cigarette has been disposed in said cigarette lighter for a given period.

6. A cigarette lighter as claimed in claim 1 wherein said third circuit board comprises a power cutting off circuit formed thereon which cuts off the electricity supplied to said heating means when the temperature is greater than a pre-determined level.

7. A cigarette lighter as claimed in claim 1 wherein the ball joint between said casing and said plug member comprises a ball-shaped element formed on the first end of said plug member and a socket element mounted on the second end of said casing to three-dimensionally rotatably receive therein said ball-shaped element of said plug member.

8. A cigarette lighter as claimed in claim 1 wherein said conductive ring comprises a plurality of outwardly-bent tabs which are elastically deflectable when said plug member is inserted into the lighter socket to provide a secure contact therebetween.

9. A cigarette lighter as claimed in claim 1 wherein said base is made of a single piece of plastic material.

10. A cigarette lighter as claimed in claim 1 wherein said base comprises an ash hole formed thereon to allow cigarette ash generated during lighting of the cigarette to be blown out thereof.

* * * * *